(12) United States Patent
Paulussen et al.

(10) Patent No.: US 7,907,345 B2
(45) Date of Patent: Mar. 15, 2011

(54) COLLIMATING MODULE AND DEVICE FOR ZERO OVERFILL ILLUMINATION APPLICATIONS WITH BEAM WIDTH CONTROL

(75) Inventors: Elvira Johanna Maria Paulussen, Eindhoven (NL); Teunis Willem Tukker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/670,433

(22) PCT Filed: Jul. 25, 2008

(86) PCT No.: PCT/IB2008/052987
§ 371 (c)(1),
(2), (4) Date: Jan. 25, 2010

(87) PCT Pub. No.: WO2009/016562
PCT Pub. Date: Feb. 5, 2009

(65) Prior Publication Data
US 2010/0188753 A1   Jul. 29, 2010

(30) Foreign Application Priority Data
Aug. 1, 2007  (EP) ..................... 07113617

(51) Int. Cl.
G02B 27/30  (2006.01)
G02B 5/02   (2006.01)

(52) U.S. Cl. ....................... 359/641; 359/599
(58) Field of Classification Search .............. 359/599, 359/641
See application file for complete search history.

(56) References Cited

U.S. PATENT DOCUMENTS

| | | | |
|---|---|---|---|
| 5,709,463 A | 1/1998 | Igram | |
| 6,139,156 A | 10/2000 | Okamori et al. | |
| 6,561,690 B2 | 5/2003 | Balestriero et al. | |
| 7,480,101 B2 * | 1/2009 | Lubart et al. ............. | 359/641 |
| 2004/0141308 A1 | 7/2004 | Saccomanno | |
| 2005/0259198 A1 | 11/2005 | Lubart et al. | |
| 2006/0039160 A1 | 2/2006 | Cassarly et al. | |
| 2006/0044531 A1 | 3/2006 | Potekev | |

FOREIGN PATENT DOCUMENTS

| | | |
|---|---|---|
| JP | 2005353816 | 12/2005 |
| WO | 02101289 A2 | 12/2002 |
| WO | 2005083318 A1 | 9/2005 |
| WO | 2005094378 A2 | 10/2005 |
| WO | 2006016326 A2 | 2/2006 |
| WO | 2006033032 A1 | 3/2006 |

\* cited by examiner

*Primary Examiner* — William C Choi

(57) ABSTRACT

A collimating module is presented. The collimating module comprises a rounded light entry side and a rectangular light exit side. A collimating device is also presented, and a method for providing collimated light. The collimating device comprises a first collimator having a light entry side and a light exit side, a scattering component having a light entry surface arranged adjacent to said light exit side, and a light exit surface. The collimating device further comprises a collimating module having a light entry side arranged adjacent to said light exit surface.

5 Claims, 3 Drawing Sheets

US 7,907,345 B2

COLLIMATING MODULE AND DEVICE FOR ZERO OVERFILL ILLUMINATION APPLICATIONS WITH BEAM WIDTH CONTROL

FIELD OF THE INVENTION

The present invention relates to a collimating module. It also relates to a collimating device for reducing overfill comprising a first collimator, a scattering component and such collimating module.

TECHNICAL BACKGROUND

Collimating components are widely used in different lighting applications. Such components can e.g. be compound parabolic concentrators, either based on total internal reflection or reflection by means of a reflective coating.

Illumination systems for digital cameras may require control of beam width between small angles and wide angles in order to illuminate objects far away or nearby. One method to perform this is to make use of a scattering device. For small angles, the light emitted from a light source is collimated by a collimating component. The collimated light illuminates a small angle display scene. For wide angles, the light emitted from a light source is collimated by a collimating component and the collimated light is scattered by a scattering device. The scattered light is then illuminating a wide angle display scene. For small angles as well as for wide angles, a part of the light is illuminating an area outside the display scene. Such light, known as overfill light, reduces the amount of light onto the display scene and makes the illumination system less efficient.

SUMMARY OF THE INVENTION

It is an object of the present invention to provide an improvement of the above techniques and prior art. More particularly, it is an object of the present invention to provide a collimating component for reducing overfill light.

The above objective is provided according to a first aspect of the invention by a collimating module comprising a light entry side and a light exit side, wherein the light entry side is rounded and the light exit side is rectangular. This is advantageous in that the collimating module reduces overfill for rectangular display scenes.

The light entry side of the collimating module may be circular, which is advantageous in that the size of the collimating module is reduced.

The collimating module may further comprise a reflective surface, which is advantageous in that the size of the collimating module may be reduced.

The collimating module may further comprise a refractive portion which is also advantageous in that the size of the collimating module may be reduced.

The above objective is provided according to a second aspect of the invention by a collimating device comprising a first collimator having a light entry side and a light exit side, a scattering component having a light entry surface arranged adjacent to said light exit side, and a light exit surface. The collimating device further comprises a collimating module having a light entry side arranged adjacent to said light exit surface, and a rectangular light exit side. The collimating device is advantageous in that it reduces overfill.

The scattering component may be a liquid crystal scatterer, which is advantageous in that the collimated beam width can be controlled.

The exit side of the first collimator and the entry side of the collimating module may be rectangular, which is advantageous in that the collimating device reduces overfill for rectangular display scenes also in tele angles.

The exit side of the first collimator and the entry side of the collimating module may be rounded, which is advantageous in that the size of the collimating device may be reduced.

The exit side of the first collimator may be circular, which is advantageous in that the size of the first collimator, and thus also the collimating device, is reduced.

The above objective is provided according to a third aspect of the invention by a method for providing collimated light. The method comprises the steps of emitting light from a light source towards a first collimator of a collimating device, collimating the emitted light by means of the first collimator, scattering the collimated light by means of a scattering component of said collimating device, and collimating the scattered light by means of a collimating module of said collimating device. The advantages of the second aspect of the invention are also applicable for this third aspect of the invention.

The step of scattering light may be performed by means of a liquid crystal scatterer.

The step of collimating the light emitted from the light source by means of the first collimator may further comprise forming a rounded beam profile.

The step of collimating the light emitted from the light source by means of the first collimator may further comprise forming a circular beam profile.

According to a fourth aspect of the invention, a lighting device is provided comprising a light source and a collimating device according to the second aspect of the invention. The advantages of the second aspect of the invention are also applicable for this fourth aspect of the invention.

Other objectives, features and advantages of the present invention will appear from the following detailed disclosure, from the attached dependent claims as well as from the drawings.

The term "rounded" hereby refers to the shape of any two dimensional closed curve being simple (i.e. not intersecting itself), differentiable (i.e. no sharp corners), and convex. A rounded shape does not necessarily need to be symmetrical.

BRIEF DESCRIPTION OF THE DRAWINGS

Embodiments of the present invention will now be described, by way of example, with reference to the accompanying schematic drawings, in which.

DETAILED DESCRIPTION OF PREFERRED EMBODIMENTS

Figure 1:
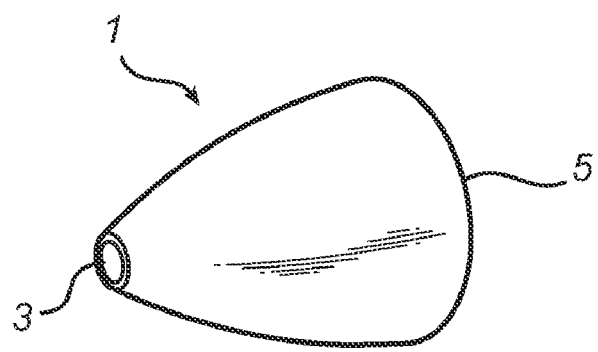
FIG. 1 shows a collimating component according to prior art.

In FIG. 1, a collimating component 1 is shown. The collimating component 1 has a circular entry side 3 and a circular exit side 5. The collimating component 1 can be a compound parabolic concentrator, either hollow or solid. Also, the collimating component 1 can reflect light either by a reflective coating on the inner surface of the collimating component 1, or by means of total internal reflection (TIR). The entry side 3 is positioned adjacent to a light source (not shown), such that divergent light emitted from the light source is incident on the entry side 3. The light source may be of any per se known type, such as a light emitting diode (LED). The incident light propagates through the collimating component and collimated light is extracted out from the exit side 5.

Figure 2:
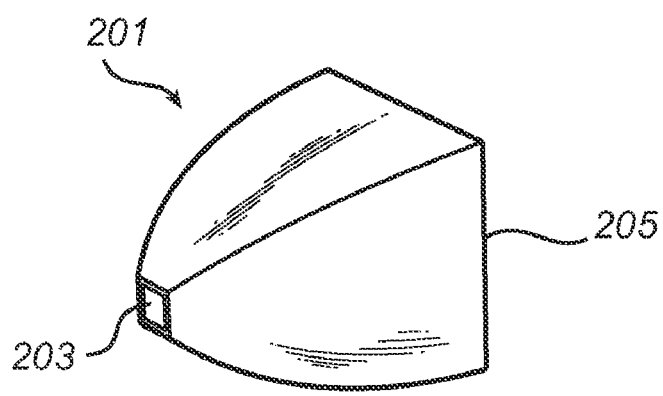
FIG. 2 shows a second collimating component according to prior art.

In FIG. 2, another collimating component 201 is shown having a rectangular entry side 203 and a rectangular exit side 205.

Figure 3:
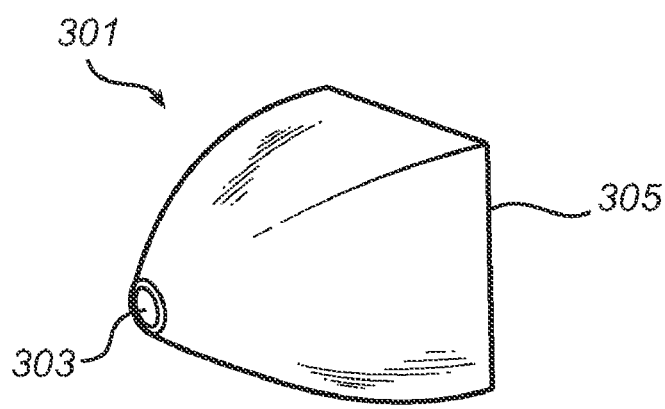
FIG. 3 shows a first embodiment of a collimating module.

In FIG. 3, one embodiment of a collimating module 301 is shown having a circular entry side 303 and a rectangular exit side 305, such that a rectangular beam profile of collimated light is extracted.

In other embodiments of a collimating module 301, the light entry side 303 may be rounded, i.e. of any shape between circular and rectangular. Such shape may e.g. include a rounded rectangle, i.e. two semicircles connected by straight line segments. Other shapes of the light entry side 303 may e.g. include a rectangle having rounded corners, or an ellipse.

Collimating components can be of different designs. In applications where the size of the collimating component is critical, the size of the collimating component can be reduced by using a collimating module 401 having an outer reflective portion 407 and an inner refractive portion 409, as for example depicted in FIG. 4. The inner refractive portion 409 can be a lens or a lens pair. The outer reflective portion 407 reflects light either by means of TIR or by means of a reflective coating.

Figure 5:
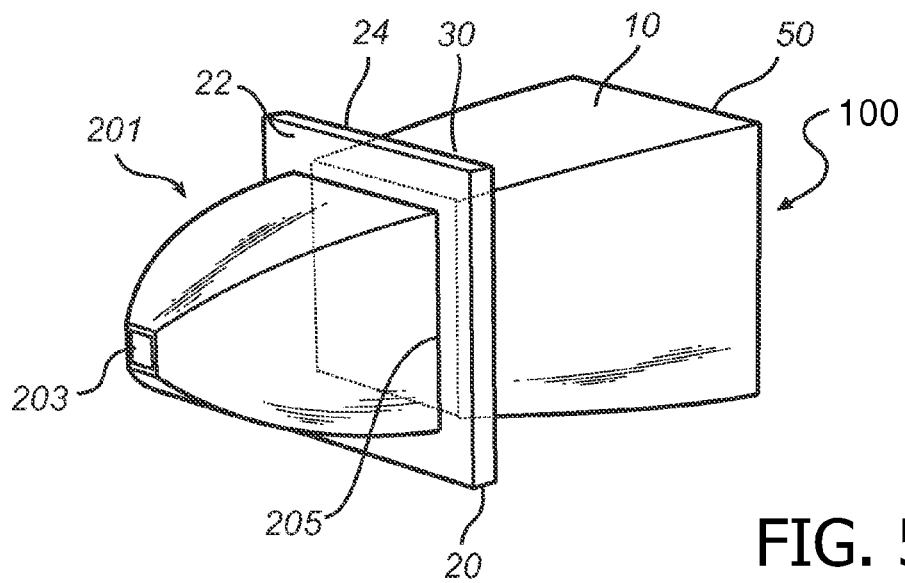
FIG. 5 shows a first embodiment of a collimating device.

In FIG. 5, a first embodiment of a collimating device 100 is shown. The collimating device 100 has a first collimator 201 and a collimating module 10. Between the first collimator 201 and the collimating module 10 a scattering component 20 is arranged, such that the exit side 205 of the first collimator 201 is connected to the entry side 30 of the collimating module. The entry side 203, 30 and the exit side 205, 50 of the first collimator 201 and the collimating module 10 are rectangular. A LED (not shown) is positioned adjacent to the entry side 203 of the first collimator 201 such that divergent light is incident on the entry side 203. The light propagates through the first collimator 201 such that the angular distribution of the light is changed. The angular distribution of the light extracted from the rectangular exit side 205 of the first collimator 201 may have an aspect ratio of 13°×10°, corresponding to a scene or object to be illuminated. For a square exit side 205, the angular distribution of the light may e.g. be 10°×10°. The rectangular beam profile of the collimated light is used for illumination in tele angles. A scattering component 20 is positioned adjacent to the exit side 205 of the first collimator 201. In one embodiment, the scattering component 20 is a liquid crystal scatterer. The scattering component 20 may have a lambertian scattering profile, a forward scattering profile or a combination of a forward scattering profile and a lambertian scattering profile. The scattering component 20 may also provide scattering profiles like Gaussian, isotropic etc.

In one embodiment, the collimating device 100 operates as follows. Divergent light is emitted from the light source (not shown) towards the light entry side 203 of the first collimating component 201. The first collimator 201 narrows the angular distribution of the light down to approximately 10°×10°. If tele illumination is desired, the scattering component 20 is turned off and the light propagates through the collimating module 10. Since the collimation angle of the collimating module 10 is larger than the collimation angle of the first collimator 201 (e.g. 30°×30° compared to 10°×10°), the collimating module 10 will not affect the angular distribution of the light. Thus, the collimating device 100 will provide light having an angular distribution of the light of approximately 10°×10°. For wide angle illumination, the scattering component 20 is turned on. The light coming from the first collimator 201 is then scattered, e.g. up to 90°×90°, and enters the collimating module 10. In this case, the collimating module 10 will affect the angular distribution of the light and narrow it down to approximately 30°×30° which is suitable for wide angle illumination.

Figure 4:
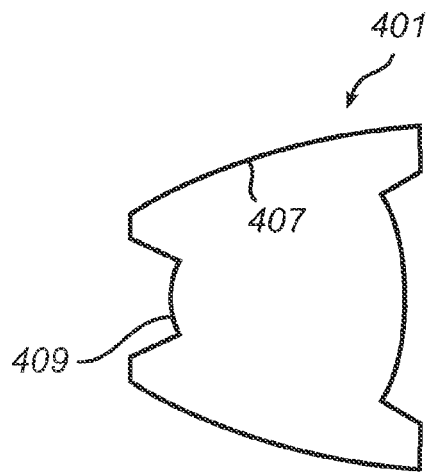
FIG. 4 shows a sectional view of a second embodiment of a collimating module.

The first collimator 201 of the collimating device 100 may either be solid or hollow. If the first collimator 201 is a compound parabolic concentrator, the size of the collimator 201 is rather large. As in case of the embodiment described above, if the first collimator 201 has a circular light entry side 203 and a rectangular light exit side 205 and a reflective and refractive portion as shown in FIG. 4, and the collimating module 10 is solid having a rectangular light entry side 30 and a rectangular light exit side 50, the total length of the collimating device is 22 mm. If the first collimator 201 has a circular light entry side 203 and a rectangular light exit side 205 and a reflective and refractive portion as shown in FIG. 4, and the collimating module 10 is hollow having a rectangular light entry side 30 and a rectangular light exit side 50, the total length of the collimating device is 14 mm.

In another embodiment, the collimation angles of the first collimator 201 and the collimating module 10 are adjusted. For illumination applications in tele angles, it is often desired to have a collimation angle of about 10°. The first collimator 201 may then have a collimation angle of about 15°, and the collimating module has a collimation angle of about 10°. The collimating module 10 accepts the angles of the light coming from the first collimator 201 and reshapes it down to e.g. 10° when the scattering component is shut off. For wide angle illumination, the liquid crystal scatterer 20 is turned on and widens the angular distribution of the light coming from the first collimator 201. The collimating module 10 is arranged adjacent to the liquid crystal scatterer 20 in order to narrow the angular distribution of the light down to e.g. 30°. This can be done if the scattering profile of the scattering component 20 has a major forward scattering profile. In such case, the light is scattered in a narrower range, e.g. 45°×45°, with a higher intensity around zero angles in respect to e.g. a Lambertian scatter profile. Thus, wide angle illumination is achieved and the illumination efficiency is improved. By using the collimating device 100 as shown in FIG. 5, the overfill light is significantly reduced in both tele and wide angles.

Figure 6:
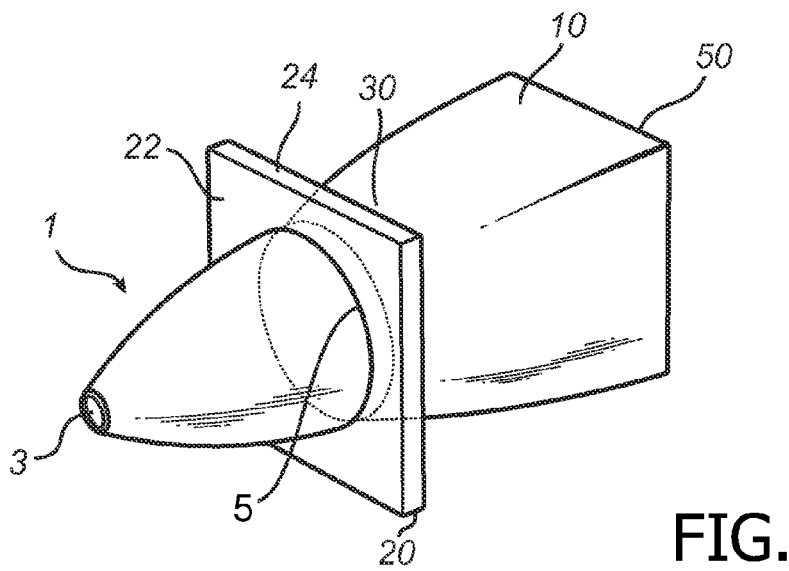
FIG. 6 shows a second embodiment of a collimating device.

FIG. 6 shows a second embodiment of a collimating device 100. The collimating device 100 has a first collimator 1 and a collimating module 10. Between the first collimator 1 and the collimating module 10 a scattering component 20 is arranged, such that the exit side 5 of the first collimator 1 is connected to the entry side 30 of the collimating module. The entry side 3 and the exit side 5 of the first collimator 1 are circular. The entry side 30 of the collimating module 10 is also circular, while the exit side 50 of the collimating module 10 is rectangular. A LED (not shown) is positioned adjacent to the entry side 3 of the first collimator 1 such that divergent light is incident on the entry side 3. The light propagates through the first collimator 1 such that the angular distribution of the light is changed. A scattering component 20 is positioned adjacent to the exit side 5 of the first collimator 1.

For tele illumination, the liquid crystal scatterer 20 is deactivated, and the illumination profile is circular. For wide angle illumination, the liquid crystal scatterer 20 is activated and scattered light is incident on the collimating module 10. The collimating module 10 is arranged adjacent to the liquid crystal scatterer 20 in order to narrow the angular distribution of the light down to approximately 30° for wide angle illumination. By using the collimating device 100 as shown in FIG. 6, the overfill light is significantly reduced in wide angles, and the size of the collimating device is reduced. If the first collimator 1 has a circular light entry side 3 and a circular light exit side 5 and a reflective and refractive portion as shown in FIG. 4, and the collimating module 10 is hollow having a circular light entry side 30 and a rectangular light exit side 50, the total length of the collimating device is 8.5 mm.

In an other embodiment of a collimating device, the first collimator has a round light entry side and a round light exit side. The collimating module has a rectangular light entry side and a rectangular light exit side. Further, the collimating module may be designed as a rectangular pipe, a rectangular compound parabolic concentrator etc.

Figure 7:
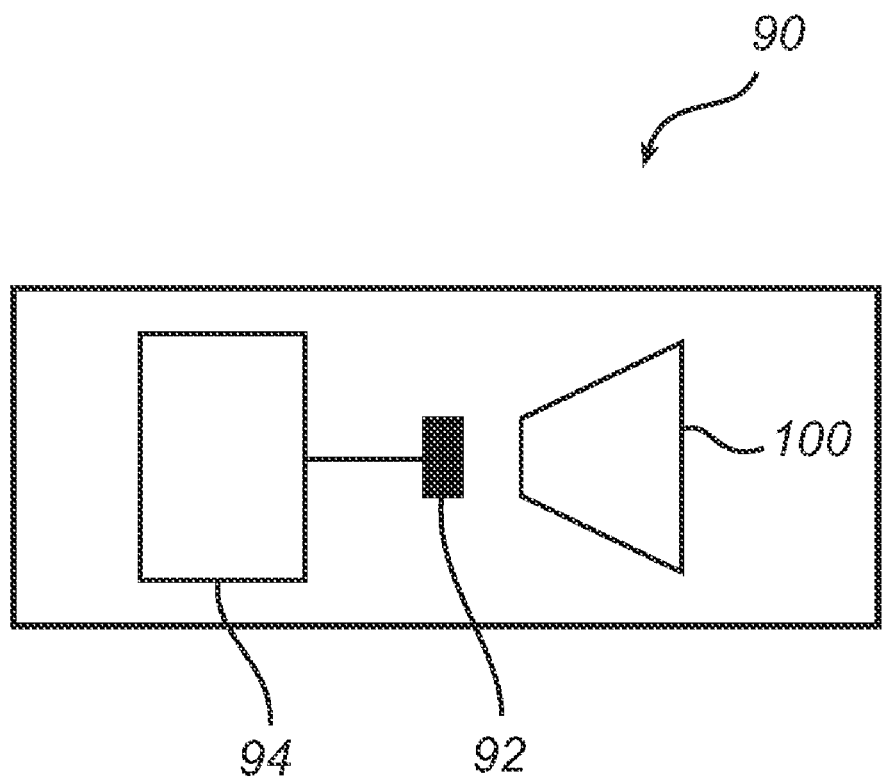
FIG. 7 shows a lighting device having a collimating device according to the present invention.

In FIG. 7, a lighting device 90 is shown. The lighting device 90 has a LED light source 92, connected to a control unit 94 for supplying power to the light source 92. The lighting device has also a collimating device 100 for collimating the light emitted from the LED 92.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A collimating device for reducing overfill, the device comprising
   a first collimator having a light entry side and a light exit side,
   a scattering component having a light entry surface arranged adjacent to said light exit side, and a light exit surface, said scattering component having an active state and an off-state and being arranged to scatter incident light in said active state, and
   a collimating module having a light entry side arranged adjacent to said light exit surface, and a substantially rectangular light exit side, wherein said collimating module has a collimation angle larger than a collimation angle of said first collimator.

2. A collimating device according to claim 1, wherein the scattering component is a liquid crystal scatterer.

3. A collimating device according to claim 1, wherein the exit side of the first collimator and the entry side of the collimating module are substantially rectangular.

4. A collimating device according to claim 1, wherein the exit side of the first collimator and the entry side of the collimating module are rounded.

5. A collimating device according to claim 1, wherein the exit side of the first collimator and the entry side of the collimating module are substantially circular.

* * * * *